Figure 1:
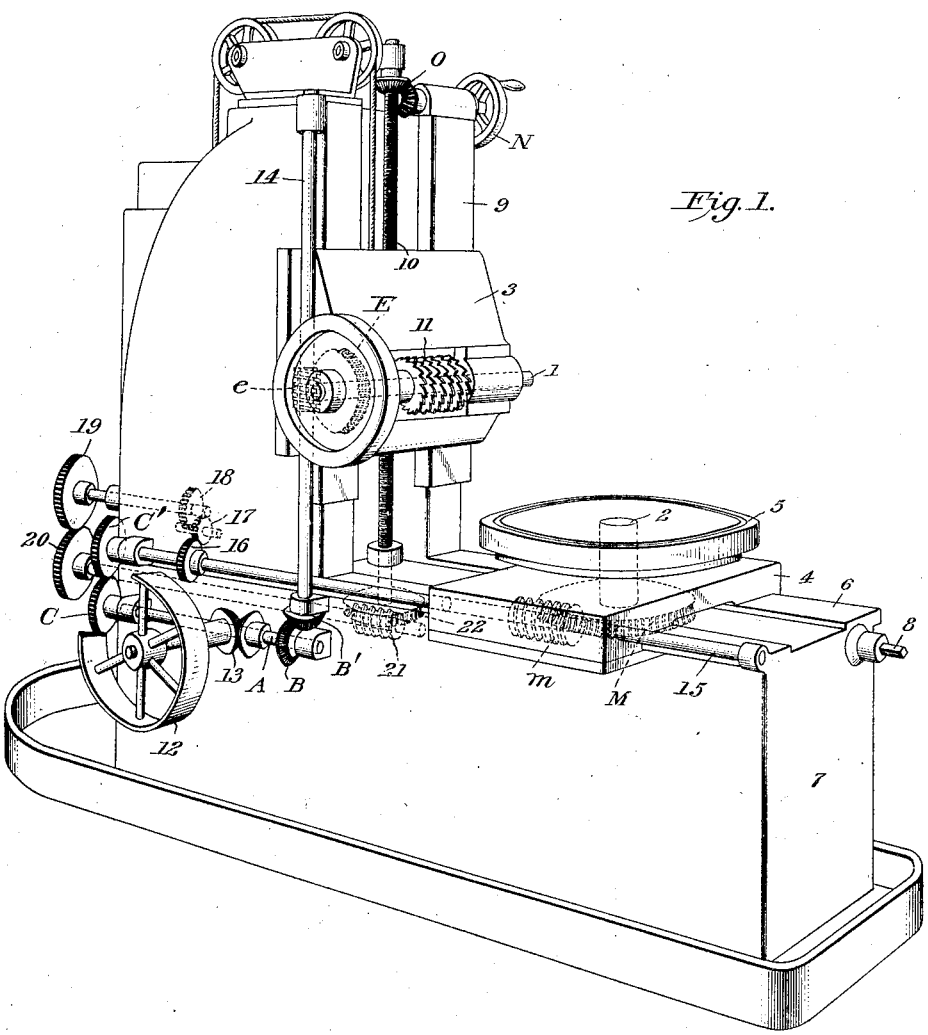

Oct. 30, 1923.

W. F. ZIMMERMANN 1,472,767

SIMPLIFIED SPUR HOBBING MACHINE

Filed Sept. 30, 1922   2 Sheets-Sheet 1

Witness
L. E. Fischer

Inventor
William F. Zimmermann
By Attorney
Albert F. Nathan

Oct. 30, 1923.

W. F. ZIMMERMANN 1,472,767

SIMPLIFIED SPUR HOBBING MACHINE

Filed Sept. 30, 1922    2 Sheets-Sheet 2

Witness
L. E. Fischer

Inventor
William F. Zimmermann
By Attorney
Albert F. Nathan

Patented Oct. 30, 1923.

1,472,767

UNITED STATES PATENT OFFICE.

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY.

SIMPLIFIED SPUR-HOBBING MACHINE.

Application filed September 30, 1922. Serial No. 591,565.

*To all whom it may concern:*

Be it known that I, WILLIAM F. ZIMMERMANN, a citizen of the United States, and residing at Maplewood, in the county of Essex and State of New Jersey, have invented a new and Improved Simplified Spur-Hobbing Machine, of which the following specification is a full disclosure.

This invention deals with machines for generating gears by the cutting action of a so-called "hob" and the primary object is to render available a structural arrangement so organized as to contribute towards the attainment of a high degree of accuracy in the machine.

In an effort to satisfy the urgent demands for extreme accuracy in the production of gears, the manufacturers of gear-cutting machinery have resorted to every available shop expedient in the direction of making the working parts of the machine as accurate as possible and of fitting them together as precisely and as perfectly as can be done. Notwithstanding every degree of care, it has been commercially difficult to build a machine which, when in operation, will manifest no appreciable fluctuations in the relative rotations between the blank being cut and the hob that is performing that operation. In the ideal machine, there should be absolute uniformity in the relationship between the rotations of the hob-supporting spindle and the work-supporting spindle inasmuch as the slightest irregularities in the rotation of either of these members (over the sought-for uniform ratio) will result in a corresponding departure of the cutting edge from its true path and will, as a consequence, produce a gear correspondingly deformed. Gears developed through a more or less irregular action may be regarded as a permanent record of those irregularities and may be expected to reproduce those irregularities when subsequently put to use.

No matter how accurately, within the limitations of manufacturing methods, the parts may be formed and mounted, each superfluous moving part will of necessity contribute a certain amount of error due to its own minor inaccuracies and, of course, where any moving part cooperates with another, there is a certain amount of back-lash which accumulates in proportion to the number of parts. This invention, therefore, undertakes to present an arrangement such as contains as few individual moving elements or units in the general transmission (extending between the work-supporting spindle and the hob-supporting spindle) as may be consistent with such other necessities as the provision for a feed of either the cutter or the blank, as the case may be, or of an adjustment in the nearness of the cutter to the blank to accommodate different sizes of blanks, or of an occasional alteration in the ratio of the gearing to vary the number of revolutions to the cutter to the revolutions of the blank for the purpose of generating different numbers of teeth.

Furthermore, it is highly desirable that the number of individually-journaled gears should be reduced to a minimum inasmuch as every isolated stud journal is a source of a certain amount of undesirable free play. Therefore, it is important that so-called idler-gears, which rotate independently about their own individual stud journals, should be dispensed with so far as possible and it is likewise important that such gears as are essential should, so far as possible, be mounted in pairs on opposite end-portions of power-transmitting shafts sufficiently long to insure the rigid preservation of the co-axial relation between as many of the gears as possible. In other words, when the motion is transmitted through two separated gears in succession, it is desirable to have the first gear mounted on the same shaft as the second gear, and so on in succession through the entire transmission so that the co-axality and the precision of mounting of the various gears shall be maintained at the highest degree possible, and so that the ample bearings afforded by comparatively long shafts may be utilized to preserve the pitch circles of the meshing gears in true coincidence.

The point of application of the power delivered by the prime-mover to the gear-train between the two spindles likewise is an important consideration of this invention. It is proposed so to apply the power that its flow to the work-supporting spindle and to the hob-supporting spindle, respectively, will be substantially equalized with the object of utilizing and balancing the normal back-lash of the parts instead of resorting to the previous practice of permitting the motion to flow from the immediate source of power to one of the spindles through a multitude of meshing gears which, of necessity, will increase the aggregated amount of backlash between the power-driven member of the transmission and the ultimately driven spindle and thereby tend to render possible an undesirable iregularity in the ultimate action due to the aggregate back-lash.

Other objects and advantages will be in part indicated in the following description and in part rendered apparent therefrom in connection with the annexed drawings.

Figure 2:
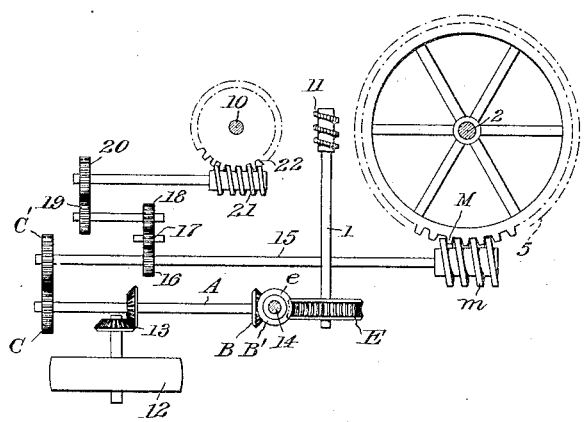
Figure 3:
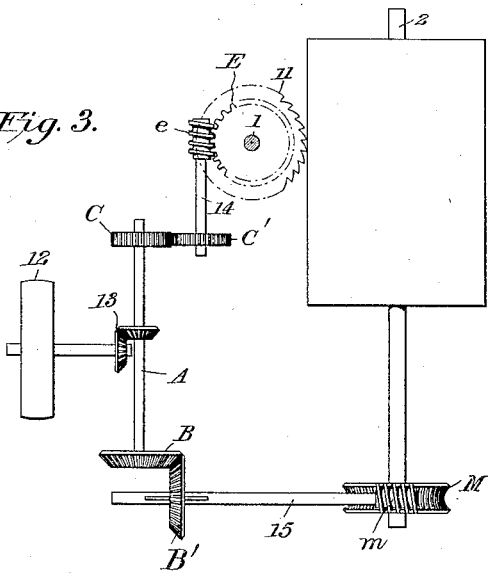

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 is a schematic perspective of a gear-hobbing machine constructed in accordance with this invention. Fig. 2 is a diagrammatic layout of the scheme of transmission of said machine, and Fig. 3 is a modification.

The invention contemplates two spindles arranged transversely; one being utilized as a hob-supporting spindle (represented by 1) and the other being utilized as a work-supporting spindle, represented by 2. These spindles are appropriately mounted; as for example, in the heads indicated by 3 and 4 respectively. Ordinarily, the work-supporting spindle will present a table 5 for convenience in the mounting of the blank or blanks to be cut and the parts will be so arranged as to permit of a so-called "feed", i. e., relative translation between the respective spindles while they are rotating. It is immaterial whether this relative rotation be obtained by the absolute translation of the cutter-supporting spindle or by the absolute translation of the work-supporting spindle and it is likewise immaterial which of these spindles be arranged vertically; the important consideration being that they are transverse to one another and that provision is made for an offset mounting of the axis of the cutter-supporting spindle with respect to the axis of the work-supporting spindle so that the teeth of the hob will operate on the periphery of the blank. When it is desirable to use the machine for cutting different diameters of gears, it is essential to provide for an adjustment of the aforesaid offset relation and that may conveniently be attained in the manner illustrated by the embodiment of the invention depicted by Fig. 1 in which the head 4 is adjustable along the slide 6 provided by the body-portion 7 of the machine; a screw-shaft such as 8, of conventional construction, being available for facilitating the adjustment. The relative translation or feed is likewise obtained by providing for a corresponding travel either of the blank spindle in the direction of its axis or, as shown by way of example by Fig. 1, of the cutter-spindle transversely to its axis. In the latter case, the frame of the machine provides a slideway 9 extending parallel with the axis of the work-supporting spindle, and the head 3 (in which the cutter-spindle 1 is journaled) is caused to travel along the slideway 9; this action being performed in a conventional manner by means of an ordinary feed-screw 10 deriving motion in any appropriate manner. By these means, the hob 11 is caused bodily to be shifted in a direction parallel with the axis of the work-supporting spindle during the process of generating the teeth on the blank.

Those familiar with the use of a hobbing-machine will appreciate that the cutter-spindle 1 will be tilted or angled slightly depending upon the characteristics of the particular hob being employed. For example, when the hob is of the type disclosed by the United States patent to Zimmermann No. 1,151,324, this angle will be zero inasmuch as that particular hob is designed to operate with its axis at an absolute right angle to the axis of the blank but, in the case of an ordinary hob, the cutter-axis will be set at an angle appreciably greater than zero, which application is determined by the conditions of operation.

This invention contemplates not more than three transmission shafts in the transmission determining the relation between the rotations of the cutting-spindle and the rotations of the work-supporting spindle. It contemplates furthermore the elimination of all idler or solitary gears from the train of gearing, and it proposes to mount and arrange such gears and shafts as are actually employed in a manner affording a very high degree of precision in the construction and performance of the machine. Very important, likewise, is the characteristic of this invention which resides in the employment of a single power-driven intermediate-shaft arranged in equalized relation to the two spindles, respectively, so that the propelling force will flow from approximately a mid-point in opposite directions to the respective spindles through such gearing as may be necessary. This characteristic of construction will best be understood by referring to the drawings in which A indicates the intermediate power-driven shaft in balanced-drive relation between the respective spindles. This shaft derives its motion, in the first instance, from a suitable prime-mover 12, as by means of suitable gearing 13, the specific character of which is unimportant. The power is taken from the shaft A at two separated points and flows in opposite directions to the respective spindles. A noteworthy characteristic of the arrangement is that the intermediate shaft A carries two distinctive species of gears, to wit, a bevel-gear B and likewise a spur-gear C; these gears being preferably rigidly secured to the shaft A and spaced apart thereon so that these three elements will all rotate as a single unit and so that the gears mentioned will be relieved from the necessity of having individual stud journals and will be maintained absolutely in co-axial relation and, likewise in accurate relation to the gears meshing therewith by reason of the facility with which the relatively long shaft A may be accurately journaled. In the form shown by Fig. 1 the bevel-gear B (which is to be regarded as representing an optional species of right-angled gear-drive) delivers the motion for rotating one of the spindles, while the spur-gear C delivers the motion for rotating the other spindle.

For establishing a propelling relation between the intermediate drive-unit C—A—B and the respective spindles, this invention embraces a first transmitting means comprising a spur-gear C' meshing with the gear C and a second transmitting means comprising a bevel-gear B' meshing with the gear B; the spur-gear C' receiving directly from the intermediate unit the motion utilized for rotating the hob-supporting spindle, and the bevel-gear B' likewise receiving directly from the same intermediate unit the motion for rotating the work-supporting spindle; this specific arrangement being shown by the modification depicted by Fig. 3. In the arrangement represented by Figs. 1 and 2 the driven spur-gear and the driven bevel-gear are connected with the spindles in an alternative manner. That is to say, in this alternative of construction, it is the bevel-gears that transmit the motion for rotating the hob-supporting spindle, and it is the spur-gears that transmit the motion for rotating the work-supporting spindle. While it is immaterial how the entire machine is positioned in space, that is whether it be placed upright or on its side, the arrangement depicted by Fig. 2 will preferably be resorted to when the machine is so placed that the axis of the work-supporting spindle extends vertically. In case it is desirable to have the work-supporting spindle extend horizontally, the arrangement indicated by Fig. 3 will preferably be employed.

In the embodiment of the invention depicted by Fig. 1, the gears C' and B' are secured to the ends of shafts which are positioned by widely spaced journals carried by the frame of the machine; one of said shafts extending parallel to the direction of "feed" between the blank and the cutter, and the other one of said shafts extending parallel to the direction of adjustment in the off-set of the cutter to the axis of the work. This enables the respective spindles to be driven by angle-gears splined directly to said shafts. For example, the hob-supporting spindle 1 has a worm-wheel E secured to its end and a worm e is splined to the transmission shaft 14 and may slide along it during the feed of the hob while continuously imparting the rotations to said hob. Likewise, the work-supporting spindle is driven by a worm-wheel M which takes its motion from a worm m that is splined to the shaft 15 and thus permits the off-set relation of the spindles to be adjusted for different diameters of teeth.

By locating the spur-gears C and C' at the adjacent ends of the intermediate power-shaft A and the parallel shaft 15, the advantage is had that, without complicating the mechanism, a variation in the ratio between the spindles becomes easily available. That is to say, the spur-gears C and C' are in the nature of change-gears and are mounted so as readily to be removable and replaced by others satisfying the new ratios demanded to the hobbing of gears of various numbers of teeth. Without this provision it would be very troublesome to alter the ratio.

It has been pointed out in connection with Fig. 1 that this machine contemplates an adjustment for changing the offset relation between the axis of the hob and the axis of the work to accommodate the production of gears of different diameters; and it has been noted that this relative movement is achieved in the case of Fig. 1 by arranging for an absolute movement of the work-supporting spindle, the worm m being splined to the horizontal shaft to provide the necessary shifting in position of the work-supporting spindle. Of course, this relative adjustment may likewise be attained by so mounting the stanchion carrying the cutter-spindle that it may be shifted on the frame of the machine; in which case, instead of having the worm m splined to its shaft, the bevel-gear which has its axis extending transverse to the work-supporting spindle will be splined to the shaft on which it is mounted, according to whether this shaft is the transverse power-shaft as shown by Fig. 2 or whether it be the transverse transmission-shaft as shown by Fig. 3. In case no adjustability of the offset is deemed necessary, the bevel-gear, or the worm, as the case may be, will preferably be non-slidably affixed to its shaft.

Thus it will be seen that, while the entire mechanism exhibits an extreme simplicity, nevertheless the universal character and adaptability of the machine has been well preserved. Starting with the initially-driven element of the transmission, each spindle drive is accomplished by four gears only so that only a single separate unit (e—14—B' and m—15—C') intervenes between the power-driven element and the spindle to be propelled thereby; thus contributing greatly to accuracy in mechanical assembly and steadiness and smoothness in operation through the balanced drive.

So far as the feeding is concerned, no great difficulty has been experienced in securing a high steady advance inasmuch as the motion is a relatively slow one derived from nut mounted in the sliding head and a conventional feed screw 10. As a matter of convenience, the feed screw may be rotated by a branch-line transmission located wherever desired, as for example, it may comprise the train of gears 16, 17, 18, 19, 20, 21 and 22 as will be understood. For preliminary adjustments, the hand-wheel N directly operating the bevel-gears O may be used for turning the screw 10.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A hobbing-machine combining a hob-supporting spindle and a work-supporting spindle; a transmission connecting said spindles and consisting of not more than three shafts, two of said shafts being arranged parallel to each other and transversely to one of said spindles, the adjacent ends of said two parallel shafts being directly connected by two change gears of the spur-tooth type, the third shaft of said transmission being arranged transversely to the other spindle and being geared at one end directly to said spindle and at its other end directly to the intermediate one of said two parallel shafts; a prime-mover geared directly to the intermediate shaft whereby the power for driving said spindles will be derived from the respective ends thereof; and means for effecting a progressive relative translation between said spindles in a direction parallel with the work-supporting spindle.

2. A hobbing-machine combining a hob-supporting spindle and a work-supporting spindle arranged transversely thereto, a first shaft arranged transversely to said hob-supporting spindle; a second shaft arranged transversely to said work-supporting spindle, the ends of said shafts being respectively geared to the adjacent spindles; a third shaft arranged parallel with one of said transmission shafts and geared at one end directly to the other transmission shaft; two intermeshing spur-gears, the one secured directly to said third shaft and the other directly to the transmission shaft parallel therewith; and means for effecting a progressive relative translation between said spindles in a direction parallel with the work-supporting spindle.

3. A hobbing-machine combining a hob-supporting spindle and a work-supporting spindle, three shafts in series, the first and the third being geared transversely to said spindles, respectively, and the intermediate second shaft being geared transversely directly to one of said spindle-geared shafts and being arranged in parallelism with the other spindle-geared shaft; two intermeshing change-gears of the spur-tooth type, the one being attached directly to the intermediate second shaft and the other being attached directly to the parallel transmission shaft; and means for effecting a progressive relative translation between said spindles in a direction parallel with the work-supporting spindle.

4. A hobbing-machine combining a hob-supporting spindle and a work-supporting spindle; a prime mover; an intermediate shaft geared between its ends directly to said prime-mover; a bevel-gear mounted at one end of said intermediate shaft, and a spur-gear mounted at its other end; and means including a bevel-gear meshing directly with first-mentioned bevel-gear for driving the hob-supporting spindle; means including a spur-gear directly meshing with said above-mentioned spur-gear for driving the work-supporting spindle; and means for effecting a progressive relative translation between said spindles in a direction parallel with the work-supporting spindle.

5. A hobbing-machine combining a hob-supporting spindle and a work-supporting spindle; a power-driven shaft arranged transversely to both of said spindles; a prime-mover geared directly to said shaft; a bevel-gear secured directly to one end of said shaft and a spur-gear secured directly to its other end; means including a bevel-gear meshing directly with said first-mentioned bevel-gear for propelling one of said spindles; means including a spur-gear meshing directly with first mentioned spur-gear for propelling the other spindle; and means for effecting a progressive relative translation between said spindles in a direction parallel with the work-supporting spindle.

6. A hobbing-machine combining a hob-supporting spindle and a work-supporting spindle; a three-shaft transmission connecting said spindles, two of said shafts being arranged parallel to each other and one of said parallel shafts being geared transversely to one of said spindles, the adjacent ends of said two parallel shafts being connected by two change-gears of the spur-tooth type, the third shaft of said transmission being arranged transversely to the other spindle and being at its one end geared directly to said other spindle and, at its other end, being connected by angle-gears directly to the intermediate one of said two parallel shafts, a prime-mover geared directly to the intermediate shaft whereby power will be derived from its respective ends for driving said spindle-propelling shafts; and means for effecting a progressive relative translation between said spindles in a direction parallel with the work-supporting spindle.

7. A hobbing-machine combining a hob-supporting spindle and a work-supporting spindle arranged transversely thereto, a first shaft arranged transversely to said hob-supporting spindle; a second shaft arranged transversely to said work-supporting spindle, the adjacent ends of said shafts being, respectively, each connected by a worm and worm-wheel to the adjacent spindles; and a third shaft arranged parallel with one of said transmission shafts and connected at one end by bevel-gears directly to the other transmission shaft; two intermeshing spur-gears, the one secured directly to said third shaft and the other directly to the transmission shaft parallel therewith; and means for effecting a progressive relative translation between said spindles in a direction parallel with the work-supporting spindle.

8. A hobbing-machine combining a hob-supporting spindle and a work-supporting spindle; three shafts, the first and the third being geared transversely to its spindle by a worm and worm-wheel, respectively, and the intermediate shaft being geared transversely directly by bevel-gears to one of said transmission shafts and being arranged in parallelism with the other transmission shaft; two intermeshing change-gears of the spur-tooth type, the one being attached directly to one end of the intermediate shaft and the other being attached directly to one end of the parallel transmission shaft; and means for effecting a progressive relative translation between said spindles in a direction parallel with the work-supporting spindle.

9. A hobbing-machine combining a hob-supporting spindle and a transverse work-supporting spindle; a prime-mover; a transmission shaft extending transversely to one of said spindles and geared intermediate its ends directly to said prime-mover; a bevel-gear mounted at one end of said intermediate shaft and a spur-gear mounted at its other end; means including a second bevel-gear meshing directly with said first-mentioned gear for driving the hob-supporting spindle; means including a second spur-gear directly meshing with said above-mentioned spur-gear for driving the work-supporting spindle; means for effecting a progressive relative translation between said spindles in a direction parallel with the work-supporting spindle.

10. A hobbing-machine combining a hob-supporting spindle and a work-supporting spindle; a power-driven shaft arranged transversely to one of said spindles; a prime-mover geared directly to an intermediate portion of said shaft; a bevel-gear permanently secured directly to one end of said shaft and a spur-gear detachably secured directly to its other end; a splined shaft arranged transversely to said power-driven shaft; a bevel-gear secured to one end of said splined-shaft and meshing directly with said first-mentioned bevel-gear; a worm splined to said splined shaft; a worm-wheel meshing therewith for propelling one of said spindles; means including a detachable spur-gear meshing directly with first-mentioned spur-gear for propelling the other spindle; and means for effecting a progressive relative translation between said spindles in a direction parallel with the work-supporting spindle.

11. A hobbing-machine combining a hob-supporting spindle and a work-supporting spindle; a transmission connecting said spindles and consisting of not more than three shafts and eight gears; a prime-mover geared directly to one of the intermediate parts whereby the power for driving each of said spindles will be transmitted by not more than four gears; and means for effecting a progressive relative translation between said spindles in a direction parallel with the work-supporting spindle.

12. A hobbing-machine combining a hob-supporting spindle and a work-supporting spindle; a transmission connecting said spindles and consisting in serial relation first of a pair of angled-gears, second of a pair of angled-gears, third of a pair of spur-gears, and fourth of a pair of angled-gears, and transmission shafts directly connecting each of said pairs of gears in series; a prime-mover connected to said transmission train, whereby the motion to the spindles will be transmitted in two paths, the one being through the second and first pairs of gears, and the other being through the third and fourth pairs of gears; and means for effecting a progressive relative translation between said spindles in a direction parallel with the work-supporting spindle.

13. A hobbing-machine combining a hob-supporting spindle and a work-supporting spindle; means for bodily shifting one of said spindles in a direction transverse to the axis of the other to adjust the off-set relation between said spindles; a transmission connecting said spindles and consisting in serial relation first of a pair of angled-gears, second of a pair of angled-gears, third of a pair of spur-gears, and fourth of a pair of angled-gears, transmission shafts directly connecting each of said pairs of gears in series, one of the angle gears of said transmission being slidably shiftable on one of said shafts, said shaft being arranged to extend in a direction transverse to the axis of the shiftable spindle; and means for effecting a progressive relative translation between said spindles in a direction parallel with the work-supporting spindle.

14. A hobbing-machine combining a hob-supporting spindle and a work-supporting spindle; means for laterally shifting the axis of one of said spindles; a transmission connecting said spindles and consisting of not more than three shafts and eight gears; a prime-mover geared directly to one of the intermediate parts whereby the power for driving each of said spindles will be transmitted by not more than four gears, one of the four gears used for propelling the laterally shiftable spindle having its axis extending in a direction transverse to the axis of said spindle and being splined to the shaft on which it is mounted; and means for effecting a progressive relative translation between said spindles in a direction parallel with the work-supporting spindle.

15. A hobbing-machine combining a hob-supporting spindle and a work-supporting spindle; a shaft arranged transversely to one of said spindles; an angle gear mounted on one end of said shaft and a spur-gear detachably secured directly to its other end; a splined shaft arranged transversely to one of said spindles; an angle gear on one end of said splined shaft and meshing directly with said first-mentioned angle-gear; a worm splined to said splined shaft; a worm-wheel meshing therewith for propelling one of said spindles, means including a detachable spur-gear meshing directly with said first-mentioned spur-gear for propelling the other spindle, and means for effecting a progressive relative translation between said spindles in a direction parallel with said work spindle.

16. A hobbing-machine combining a hob-supporting spindle, and a work-supporting spindle; a shaft arranged transversely to said spindles; an angle gear mounted at one end of said shaft and a spur-gear detachably secured directly to its other end; two splined shafts arranged transversely to said spindles, respectively; an angle gear secured to one end of one of said splined shafts and meshing directly with said first mentioned angle gear, a detachable spur-gear secured directly to one end of the other splined shaft and meshing directly with said first-mentioned spur-gear; a worm splined to each of said splined shafts, worm-wheels meshing directly with said worms for propelling said spindles; and means for effecting a progressive relative translation between said spindles in a direction parallel with said work spindle.

In witness whereof, I hereunto subscribe my name, as attested by the two subscribing witnesses.

WILLIAM F. ZIMMERMANN.

Witnesses:
H. A. SCHUERMANN,
DOLLY WEISHEIT.